(12) United States Patent
Merriman et al.

(10) Patent No.: US 7,827,062 B2
(45) Date of Patent: Nov. 2, 2010

(54) METHOD OF DELIVERY, TARGETING, AND MEASURING ADVERTISING OVER NETWORKS

(75) Inventors: Dwight Allen Merriman, New York, NY (US); Kevin Joseph O'Connor, New York, NY (US)

(73) Assignee: Google Inc., Mountain View, CA (US)

( * ) Notice: Subject to any disclaimer, the term of this patent is extended or adjusted under 35 U.S.C. 154(b) by 1520 days.

(21) Appl. No.: 10/798,444

(22) Filed: Mar. 12, 2004

(65) Prior Publication Data

US 2004/0172324 A1 Sep. 2, 2004

Related U.S. Application Data

(60) Division of application No. 10/254,923, filed on Sep. 26, 2002, which is a continuation of application No. 09/293,463, filed on Apr. 15, 1999, now abandoned, which is a continuation of application No. 08/738,634, filed on Oct. 29, 1996, now Pat. No. 5,948,061.

(51) Int. Cl.
*G06F 17/60* (2006.01)
(52) U.S. Cl. ............... 705/14.55; 705/14.49; 705/14.53
(58) Field of Classification Search .............. 705/14.49, 705/14.53, 14.55
See application file for complete search history.

(56) References Cited

U.S. PATENT DOCUMENTS 4,602,279 A 7/1986 Freeman
4,703,423 A 10/1987 Bado et al.
4,775,935 A 10/1988 Yourick
4,789,235 A 12/1988 Borah et al.
4,850,007 A 7/1989 Marino et al.
4,870,579 A 9/1989 Hey
4,996,642 A 2/1991 Hey
5,027,400 A 6/1991 Baji et al.
5,099,422 A 3/1992 Foresman et al.
5,105,184 A 4/1992 Pirani et al.
5,155,591 A 10/1992 Wachob
5,166,866 A 11/1992 Kim et al.
5,191,410 A 3/1993 McCalley et al.

(Continued)

FOREIGN PATENT DOCUMENTS

DE 19528911 A1 2/1997

(Continued)

OTHER PUBLICATIONS

17625888; Java and Blackbird: extending the Web . . . ; Seybold Reoport on Publishing Systems; Oct. 23, 1995.

(Continued)

*Primary Examiner*—James W Myhre
*Assistant Examiner*—Michael Goldman
(74) *Attorney, Agent, or Firm*—Fish & Richardson P.C.

(57) ABSTRACT

Methods and apparatuses for targeting the delivery of advertisements over a network such as the Internet are disclosed. Statistics are compiled on individual users and networks and the use of the advertisements is tracked to permit targeting of the advertisements of individual users. In response to requests from affiliated sites, an advertising server transmits to people accessing the page of a site an appropriate one of the advertisement based upon profiling of users and networks.

23 Claims, 2 Drawing Sheets

U.S. PATENT DOCUMENTS

| | | |
|---|---|---|
| 5,220,501 A | 6/1993 | Lawlor et al. |
| 5,253,341 A | 10/1993 | Rozmanith et al. |
| 5,260,778 A | 11/1993 | Kauffman et al. |
| 5,261,094 A | 11/1993 | Everson et al. |
| 5,283,731 A | 2/1994 | Lalonde et al. |
| 5,305,195 A | 4/1994 | Murphy |
| 5,347,632 A | 9/1994 | Filepp et al. |
| 5,355,327 A | 10/1994 | Stent et al. |
| 5,361,393 A | 11/1994 | Rossillo |
| 5,377,354 A | 12/1994 | Scannell et al. |
| 5,412,416 A | 5/1995 | Nemirofsky |
| 5,442,771 A | 8/1995 | Filepp et al. |
| 5,446,891 A | 8/1995 | Kaplan et al. |
| 5,446,919 A | 8/1995 | Wilkins |
| 5,448,625 A | 9/1995 | Lederman |
| 5,459,656 A | 10/1995 | Fields et al. |
| 5,469,206 A | 11/1995 | Strubbe et al. |
| 5,475,819 A | 12/1995 | Miller et al. |
| 5,477,451 A | 12/1995 | Brown et al. |
| 5,499,046 A | 3/1996 | Schiller et al. |
| 5,504,744 A | 4/1996 | Adams et al. |
| 5,504,894 A | 4/1996 | Ferguson et al. |
| 5,515,098 A | 5/1996 | Carles |
| 5,515,270 A | 5/1996 | Weinblatt |
| 5,537,542 A | 7/1996 | Eilert et al. |
| 5,550,746 A | 8/1996 | Jacobs |
| 5,559,548 A | 9/1996 | Davis et al. |
| 5,566,353 A | 10/1996 | Cho et al. |
| 5,568,612 A | 10/1996 | Barrett et al. |
| 5,572,643 A | 11/1996 | Judson |
| 5,584,025 A | 12/1996 | Keithley et al. |
| 5,594,910 A | 1/1997 | Filepp et al. |
| 5,598,536 A | 1/1997 | Slaughter, III et al. |
| 5,600,364 A | 2/1997 | Hendricks et al. |
| 5,621,812 A | 4/1997 | Deaton et al. |
| 5,636,346 A | 6/1997 | Saxe |
| 5,638,457 A | 6/1997 | Deaton et al. |
| 5,649,114 A | 7/1997 | Deaton et al. |
| 5,675,662 A | 10/1997 | Deaton et al. |
| 5,692,132 A | 11/1997 | Hogan |
| 5,696,965 A | 12/1997 | Dedrick |
| 5,704,017 A | 12/1997 | Heckerman et al. |
| 5,704,018 A | 12/1997 | Heckerman et al. |
| 5,708,780 A | 1/1998 | Levergood et al. |
| 5,710,887 A | 1/1998 | Chelliah et al. |
| 5,712,979 A | 1/1998 | Graber et al. |
| 5,717,860 A | 2/1998 | Graber et al. |
| 5,717,923 A | 2/1998 | Dedrick |
| 5,721,827 A | 2/1998 | Logan et al. |
| 5,724,424 A | 3/1998 | Gifford |
| 5,724,521 A | 3/1998 | Dedrick |
| 5,727,156 A | 3/1998 | Herr-Hoyman et al. |
| 5,734,720 A | 3/1998 | Salganicoff |
| 5,734,828 A | 3/1998 | Pendse et al. |
| 5,737,619 A | 4/1998 | Judson |
| 5,740,252 A | 4/1998 | Minor et al. |
| 5,740,549 A | 4/1998 | Reilly et al. |
| 5,745,681 A | 4/1998 | Levine et al. |
| 5,751,956 A | 5/1998 | Kirsch |
| 5,752,022 A | 5/1998 | Chiu et al. |
| 5,752,238 A * | 5/1998 | Dedrick .................... 705/14.69 |
| 5,754,772 A | 5/1998 | Leaf |
| 5,754,938 A | 5/1998 | Herz et al. |
| 5,754,939 A | 5/1998 | Herz et al. |
| 5,757,917 A | 5/1998 | Rose et al. |
| 5,761,601 A | 6/1998 | Nemirofsky et al. |
| 5,768,521 A | 6/1998 | Dedrick |
| 5,774,170 A | 6/1998 | Hite et al. |
| 5,778,367 A | 7/1998 | Wesinger, Jr. et al. |
| 5,781,894 A | 7/1998 | Petrecca et al. |
| 5,787,253 A | 7/1998 | McCreery et al. |
| 5,790,426 A | 8/1998 | Robinson |
| 5,790,935 A | 8/1998 | Payton |
| 5,794,210 A | 8/1998 | Goldhaber et al. |
| 5,796,945 A | 8/1998 | Tarabella |
| 5,796,952 A | 8/1998 | Davis et al. |
| 5,809,242 A | 9/1998 | Shaw et al. |
| 5,812,769 A | 9/1998 | Graber et al. |
| 5,812,776 A | 9/1998 | Gifford |
| 5,815,148 A | 9/1998 | Tanaka |
| 5,819,285 A | 10/1998 | Damico et al. |
| 5,838,790 A | 11/1998 | McAuliffe et al. |
| 5,842,199 A | 11/1998 | Miller et al. |
| 5,848,396 A | 12/1998 | Gerace |
| 5,848,397 A | 12/1998 | Marsh et al. |
| 5,855,008 A | 12/1998 | Goldhaber et al. |
| 5,870,724 A | 2/1999 | Lawlor et al. |
| 5,873,068 A | 2/1999 | Beaumont et al. |
| 5,893,075 A | 4/1999 | Plainfield et al. |
| 5,913,040 A | 6/1999 | Rakavy et al. |
| 5,918,014 A | 6/1999 | Robinson |
| 5,933,811 A | 8/1999 | Angles et al. |
| 5,933,827 A | 8/1999 | Cole et al. |
| 5,937,162 A | 8/1999 | Funk et al. |
| 5,937,392 A | 8/1999 | Alberts |
| 5,946,646 A | 8/1999 | Schena et al. |
| 5,948,061 A | 9/1999 | Merriman et al. |
| 5,950,173 A | 9/1999 | Perkowski |
| 5,956,024 A | 9/1999 | Strickland et al. |
| 5,960,409 A | 9/1999 | Wexler |
| 5,960,429 A | 9/1999 | Peercy et al. |
| 5,963,915 A | 10/1999 | Kirsch |
| 5,990,927 A | 11/1999 | Hendricks et al. |
| 5,999,912 A | 12/1999 | Wodarz et al. |
| 6,002,393 A | 12/1999 | Hite et al. |
| 6,005,566 A | 12/1999 | Jones et al. |
| 6,005,567 A | 12/1999 | Nielsen |
| 6,006,197 A | 12/1999 | D'Eon et al. |
| 6,006,252 A | 12/1999 | Wolfe |
| 6,016,509 A | 1/2000 | Dedrick |
| 6,020,887 A | 2/2000 | Loring et al. |
| 6,026,368 A | 2/2000 | Brown et al. |
| 6,029,141 A | 2/2000 | Bezos et al. |
| 6,029,195 A | 2/2000 | Herz |
| 6,049,777 A | 4/2000 | Sheena et al. |
| 6,049,878 A | 4/2000 | Caronni et al. |
| 6,052,554 A | 4/2000 | Hendricks et al. |
| 6,061,659 A | 5/2000 | Murray |
| 6,119,101 A | 9/2000 | Peckover |
| 6,182,050 B1 | 1/2001 | Ballard |
| 6,185,586 B1 | 2/2001 | Judson |
| 6,223,215 B1 | 4/2001 | Hunt et al. |
| 6,247,047 B1 | 6/2001 | Wolff |
| 6,269,361 B1 | 7/2001 | Davis et al. |
| 6,434,614 B1 | 8/2002 | Blumenau |
| 6,466,970 B1 | 10/2002 | Lee et al. |
| 6,615,251 B1 | 9/2003 | Klug et al. |
| 6,718,551 B1 | 4/2004 | Swix et al. |
| 6,757,662 B1 | 6/2004 | Greenwald et al. |
| 6,757,710 B2 | 6/2004 | Reed |
| 6,782,369 B1 | 8/2004 | Carrott |
| 7,039,599 B2 | 5/2006 | Merriman et al. |
| 7,136,853 B1 | 11/2006 | Kohda et al. |
| 7,496,943 B1 | 2/2009 | Goldberg et al. |
| 2001/0037205 A1 | 11/2001 | Joao |
| 2001/0056374 A1 | 12/2001 | Joao |
| 2002/0013785 A1 | 1/2002 | Miyazaki et al. |
| 2002/0019831 A1 | 2/2002 | Wade |
| 2002/0046118 A1 | 4/2002 | Minte |
| 2002/0082923 A1 | 6/2002 | Merriman et al. |
| 2002/0099600 A1 | 7/2002 | Merriman et al. |
| 2002/0103698 A1 | 8/2002 | Cantrell |
| 2002/0120507 A1 | 8/2002 | Chanos et al. |
| 2003/0023489 A1 | 1/2003 | McGuire et al. |

| | | | |
|---|---|---|---|
| 2005/0033855 A1 | 2/2005 | Moradi et al. | |
| 2005/0197164 A1 | 9/2005 | Chan | |
| 2008/0276271 A1 | 11/2008 | Anderson et al. | |
| 2009/0044246 A1 | 2/2009 | Sheehan et al. | |

FOREIGN PATENT DOCUMENTS

| | | |
|---|---|---|
| EP | 0 216 535 A2 | 4/1987 |
| EP | 0 216 535 A3 | 4/1987 |
| EP | 0 355 697 A2 | 2/1990 |
| EP | 0 355 697 A3 | 2/1990 |
| EP | 0 355 697 B1 | 2/1990 |
| EP | 0 643 359 A2 | 3/1995 |
| EP | 0 643 359 A3 | 3/1995 |
| EP | 0 749 081 A1 | 12/1996 |
| EP | 0 875 843 A1 | 11/1997 |
| EP | 0 814 419 A2 | 12/1997 |
| EP | 0 818 742 A1 | 1/1998 |
| EP | 0 834 822 A2 | 4/1998 |
| EP | 0 834 822 A3 | 4/1998 |
| EP | 0 837 407 A1 | 4/1998 |
| EP | 0 838 769 A2 | 4/1998 |
| EP | 0 849 689 A2 | 6/1998 |
| EP | 0 849 689 A3 | 6/1998 |
| EP | 0 864 990 A2 | 9/1998 |
| EP | 0 864 990 A3 | 9/1998 |
| EP | 0 869 448 A1 | 10/1998 |
| EP | 0 749 081 B1 | 11/1998 |
| EP | 0 877 314 A1 | 11/1998 |
| EP | 0 897 158 A1 | 2/1999 |
| EP | 0 897 158 A4 | 2/1999 |
| JP | H5143653 A | 6/1993 |
| JP | 9091215 | 4/1997 |
| JP | 10049591 A | 2/1998 |
| JP | 10320336 | 12/1998 |
| WO | WO 84/01382 A1 | 4/1984 |
| WO | WO 84/01382 A4 | 10/1984 |
| WO | WO 84/01382 B1 | 10/1984 |
| WO | WO 93/16443 A1 | 8/1993 |
| WO | WO 93/19427 A1 | 9/1993 |
| WO | WO 94/23383 A1 | 10/1994 |
| WO | WO 95/12176 A2 | 5/1995 |
| WO | WO 95/12176 A3 | 5/1995 |
| WO | WO 95/12176 A4 | 5/1995 |
| WO | WO 95/13587 A1 | 5/1995 |
| WO | WO 95/16971 A1 | 6/1995 |
| WO | WO 95/16971 A4 | 6/1995 |
| WO | WO 96/31848 A2 | 9/1996 |
| WO | WO 96/31848 A3 | 9/1996 |
| WO | WO 96/30864 A1 | 10/1996 |
| WO | WO 96/36926 A1 | 11/1996 |
| WO | WO 96/38796 A1 | 12/1996 |
| WO | WO 96/39668 A1 | 12/1996 |
| WO | WO 97/07656 A2 | 3/1997 |
| WO | WO 97/07656 A3 | 3/1997 |
| WO | WO 97/21183 A1 | 6/1997 |
| WO | WO 97/41673 A2 | 11/1997 |
| WO | WO 97/41673 A3 | 11/1997 |
| WO | WO 96/38796 B1 | 3/1998 |
| WO | WO 98/34189 A1 | 9/1998 |
| WO | WO 98/57275 A2 | 12/1998 |
| WO | WO 98/57275 A3 | 12/1998 |
| WO | WO 98/57285 A1 | 12/1998 |
| WO | WO 01/65747 A1 | 9/2001 |

OTHER PUBLICATIONS

17497026; Look who's surfing . . . ; Schurr; PC Week; Oct. 30, 1995.
17594025; HotWired and Neilsem team to verify usage data; Electronic Marketplace Report; Jul. 4, 1995.
17225819; Write once, publish many times; Ratcliffe; Digital Media; Aug. 7, 1995.
17189959; Product View seeks funding for 3Q launch of ad-supported . . . ; Electronic Marketplace Report; May 16, 1995.
17244186; Free E-Mail with Postage Stamp "Ads"; Newsbytes; Jul. 3, 1995.
CWK19951009S0006; Search-engine advertising; Frook; Communications Week; Nov. 9, 1995.
www5conf.inria.fr; Ubiquitous Advertising on the WWW; Kohda et al; Fifth International WWW Conference; May 6-10, 1996.
Bounty Quest home page article titled DoubleClick Bounty Paid Ad Pioneer Turned Online Porn Mogul Wins $10,000; (<http://www.bountyquest.com/>; printed on Mar. 9, 2001).
Bounty Quest Web page displaying article titled Bounty Collected Double Click Banner Ad Patent; (http://www.bountyquest.com/bounties/displayBounty.php?bountyName=1019; printed on Mar. 9, 2001).
Bounty Quest Web page displaying article titled Digital Porn Mogul Wins Silver Bullet Award; (http://www.bountyquest.com/winner/bschuster.htm; printed on Mar. 9, 2001).
Bounty Quest Web page displaying article titled DoubleClick Prior Art; (http://www.bountyquest.com/patentinfo/doucleclickart.htrn; printed on Mar. 9, 2001).
Business Plan posted on Bounty Quest Website titled Summary of Proposed Business Activities for the World Wide Internet Network (WWIN); (http://www.bountyquest.com/images/doubleclickPage9.gif; printed on Mar. 9, 2001).
Sales Literature posted on Bounty Quest Website titled What You Get with WWIN; (http://bountyquest.com/images/doubleclickGet.gif; printed on Mar. 9, 2001).
CNET Press Release titled About CNET; (http://www.canada.cnet.com/aboutcnet/0-13613-7-808022.html; printed on Mar. 9, 2001).
ADMedium Newsletter linked from Bounty Quest Website; (http://uts.cc.utexas.edu/tecas/nl9_2_96.html; printed on Apr. 4, 2001).
Booker, Ellis "Seeing a Gap, A Palo Alto Startup Will Debut Advertising Server for the Net", Web Week, v.2 iss. 2. Available online at http://internetworld.com. Feb. 1996.
Metcalf, Bob "From the Ether", InfoWorld, v.18 iss.3. Available at http://infoworld.com, Aug. 1996.
NetGravity AdServer 2.0 Announcement. Available at http://netgravity.com, Oct. 1996.
Kohda Yet al: Ubiquitous advertising on the WWW: Merging Advertising on the Browser, Computer Networks and ISDN Systems, vol. 28, No. 11, May 1996, pp. 1493-1499.
Cashing in: The rush is on to buy and sell on the Internet, Interactive Media & Marketing, Adv. Age, p. 11, Dec. 19, 1994.
Improved Internet security enabling . . . , PC Week, v12, n11, p. 1(2), Mar. 20, 1995.
Internet access: Internet marketing revolution . . . , EDGE Work-Group Computing Report, v7, n316, p. 2(1), Jun. 3, 1996.
"MediaLink: Bell Laboratories unveils sophisticated Information insertion technology for broadcast and cable advertising," EDGE, v11, p. 43(1), Dec. 16, 1996.
"Infoseek Offers Web Advertisers Customized Delivery of Ads," Newsbytes, pNEW05270111, May 27, 1997.
Blankenhorn, Dana; "Sites experiment with advertising to offer free service," Advertising Age's Business Marketing, v82, p. 29, Jul. 1997.
Lockard, Meredith; "Advertising done your way," Target Marketing, v20, n10, p. 40, ISSN: 0889-5333, Oct. 1997.
"Ericsson Introduces New Intelligent Network-Based Internet Advertiser At Internet World '98," Business Wire, p. 0240, Oct. 7, 1998.
Chat Transcript; Topic: Ad Measurement and Management; Oct. 15, 1998; (http://www.zeff.com/learn/zdu/advertising/zinman.html; printed on Feb. 7, 2000).
CNET Press Release titled "CNET Online Signs Up More Than a Quarter of a Million Members Through Voluntary Registration after Only Five Months"; (http://home.cnet.com/aboutcnet/0-13613-7-808021.html; printed on Nov. 26, 1999).
Hypertext Markup Language—2.0; Nov. 1995 (Draft HTML 2.0 Specification; Sep. 22, 1995).
Webster's Third New International Dictionary of the English Language Unabridged, 1967, p. 2171 "some".
Microsoft Press Computer Dictionary Third Edition, 1997, p. 387 "proxy server".

Bill Harvey, The Expanded ARF Model: Bridge to the Accountable Advertising Future, Journal of Advertising Research, Mar./Apr. 1997, pp. 11-20.

Cespedes & Smith, Database Marketing: New Rules for Policy and Practice, Sloan Management Review, Summer, 1993, pp. 7-22.

Preston Gralla, How the Internet Works, Aug. 1999, Millennium Edition, 202-204 and 243-247.

Miller, B., "GroupLens: An Open Architecture for Collaborative Filtering," ftp://ftp.cs.umn.edu/users/bmiller/prop.ps, Univ. of Minn., pp. 1-18, Oct. 1995.

Upendra Shardanand, "*Social Information Filtering for Music Recommendation*" Sep. 1994, pp. 1-93, Massachusetts Institute of Technology, Thesis.

"WWW.barnesandnoble.com" ("WWW.firefly.com"), web site pages, 12 pages, printed out on Jan. 21, 1998 (origination date unknown).

"WWW.amazon.com", web site pages, 15 pages, printed out on Jan. 21, 1998 (origination date unknown).

Microsoft Press Computer Dictionary Third Edition, 1997, pp. 271 ("junction"), 285 ("link"), 331 ("node").

51st IETF—Whois enhancement BOF (whoisfix), Aug. 1, 2001.

Doubleclick Measures Beyond the Click With New "Spotlight" Software, Sep. 4, 1996, Doubleclick.

Doubleclick Unveils Internet Ad Tracking Product, Sep. 4, 1996, Reuter Financial Report.

Doubleclick Shines Its Spotlight, Sep. 5, 1996, Advertising Age—Interactive Daily.

Spotlight on Doubleclick, Sep. 13, 1996, Information & Interactive Services Report.

Tracking Services Tallies Ad Response, Online Orders, Sep. 16, 1996, DMNews.

Luring in Customers Via Web Advertising, Oct. 1996, Business Strategies.

Business Wire (New York, Nov. 17, 1998). "i3 Communications Links Personal Finance Sites With Dynamic Investment Research Banners; Quote.com and Multex Partner Using i33's AdMaximize Technology".

David E. Zinman (founder of FocaLink), Deposition Transcript from *DoubleClick, Inc.* v. *L90, Inc.*, 00 Civ. 2690, S.D.N.Y.

Ronald A. Kovas (CEO of FocaLlnk), Deposition Transcript from *DoubleClick, Inc.* v. *L90, Inc.*, 00 Civ. 2690, S.D.N.Y.

LinkMarket Business Plan; David Zinman et al.; SD005545-SD005569.

LinkMarket; David Zinman et al.; SD005573-SD005574.

"Online Marketing: . . . "; Internet Week, vol. 1, Issue 36; Dec. 18, 1995; SD005584-SD005585.

David Zinman; http://www.focalink.com/dzinman/bio.html; SD005586.

"Seeing A Gap . . . "; Ellis Booker; http://www.internetworld.com/print/1996/02/01/industry/ad-server.html; Feb. 1996; SD005587.

"readme. 1st; . . . "; David Evans; Marketing Computers, No. 2, vol. 16, p. 12; Feb. 1996; SD005588-SD005589.

"Focalink Will Monitor . . . "; Julia Angwin; San Francisco Chronicle; Feb. 7, 1996; SD005590.

"Media Daily Special: . . . "; Sean Butterbaugh; Media Daily, No. 5, vol. 4; Feb. 7, 1996; SD005591-SD005592.

"Internet Access: Major Companies . . . "; Edge: Work-Group Computing Report; Feb. 12, 1996; SD005593-SD005594.

"Internet Access: First Advertising . . . "; Edge: Work-Group Computing Report; Feb. 12, 1996; SD005595-SD005596.

"Internet Access: Major Companies . . . "; Edge: Work-Group Computing Report; Feb. 12, 1996; SD005597-SD005598.

"Another Media-Buying Firm . . . "; Media Daily, No. 5, vol. 4; Feb. 14, 1996; SD005599-SD005601.

"Working the Web; . . . "; Jennifer Reese; Executive Female, No. 2, vol. 19, p. 24; Mar. 13, 1996; SD005602-SD005604.

"Web ad-management software . . . "; John Evan Frook; InternetWeek; Mar. 18, 1996; SD005605-SD005607.

"Unraveling a tangled Web; . . . "; Ken Siegmann; PC Week, No. 15, vol. 13, p. A4; Apr. 15, 1996; SD005608-SD005610.

"Web Site Links: . . . "; Electronic Marketplace Report, No. 16, vol. 9; Aug. 22, 1995; SD005611-SD005613.

"Interactive Media & Marketing . . . "; Advertising Age; Dec. 11, 1995; SD005614-SD005615.

"Major Companies, Ad Agencies . . . "; Business Wire; Feb. 5, 1996; SD005616-SD005617.

"First Advertising Server Launched . . . "; Business Wire; Feb. 5, 1996; SD005618-SD005619.

"Interactive; Focalink and Doubleclick . . . "; Kim Cleland; Advertising Age, p. 30; Feb. 5, 1996; SD005620-S0005621.

"First Advertising Server Launched . . . "; Business Wire; Feb. 5, 1996; SD005622-SD005623.

"Major Companies, Ad Agencies . . . "; Business Wire; Feb. 5, 1996; SD005624-SD005625.

Web Personals Report; Oct. 12, 1995; Z00001-Z00009 / SD027072-SD027080.

FocaLink Technology; Aug. 30, 1995; Z00010-Z00011 / SD027081-SD027082.

Web Personals stats; Aug. 22, 1995; Z00012-Z00013 / SD027083-SD027084.

For Immediate Release; Hyperlink Advertising Explodes on the World Wide Web; http://link.w3.com; Z00014 / SD027085.

Interactive Age; The Newspaper for Electronic Commerce; Z00015-Z00019 / SD027086-SD027090.

Link Marketing, LLP; Z00020-Z00021 / SD027091-SD027092.

Link Marketing; Z00022-Z00027 / SD027093-SD027098.

LinkMarket; David Zinman et al.; Z00028-Z00030 / SD027099-SD027101.

LinkMarket; David Zinman at al.; Z00031-Z00032 / SD027102-SD027103.

LinkMarket; David Zinman et al.; Z00033-Z00056 / SD027104-SD027127.

FocalLink Media Services, Inc.; David Zinman at al.; Aug. 2, 1995; Z00057-Z00070 / SD027128-SD027141.

Saturn Banner Ad Placement; Aug. 25, 1995; Z00071 / SD027142.

Sponsorable Site—Riddle Du Jour; Aug. 26, 1995; Z00072-Z00074 / SD027143-SD027145.

Saturn Banner Ad Placement; Aug. 27, 1995; Z00075 / SD027146.

FocaLink Technology; Aug. 30, 1995; Z00076-Z00077 / SD027147-SD027148.

Question for you; Sep. 7, 1995; Z00078-Z00079 / SD027149-SD027150.

Information Request; Sep. 12, 1995; Z00080 / SD027151.

Update and Miscellaneous; Sep. 22, 1995; Z00081-Z00083 / SD027152-SD027154.

FocalLink: request for ISN ad traffic data (fwd); Sep. 26, 1995; Z00084-Z00085 / SD027155-SD027156.

Saturn Ad Placements; Sep. 28, 1995; David Zinman; Z00086 / SD027157.

RE> Saturn Ad Placements; Sep. 29, 1995; Adam@utne.co; Z00087 / SD027158.

RE: Advertising Update; Oct. 3, 1995; Eric Ver Ploeg; Z00088-Z00089 / SD027159-SD027160.

RE>>Saturn Ad Placements; Sep. 29, 1995; wigley©utne.com; Z00090 / SD027161.

Re: Test Parameters (fwd); Oct. 23, 1995; Jason Strober; Z00091-Z00092 / SD027162-SD027163.

Re: Rest Parameters; Oct. 23, 1995; Jason Strober; Z00093-Z00094 / SD027164-SD027165.

Proposal (fwd); Oct. 23, 1995; Jason Strober; Z00095-Z00096 / SD027166-SD027167.

Advertising advisory board; Oct. 25, 1995; David Zinman; Z00097-Z00099 / SD027168-SD027170.

Contact at Netcom; Oct. 26, 1995; David Zinman; Z00100 / SD027171.

CMP Technical Contact; Oct. 30, 1995; Jason Strober; Z00104 / SD027172.

From ad age today . . . ; Oct. 30, 1995; Karen Johnson; Z00105-200106 / SD027173-S0027174.

We need to get on this; Oct. 31, 1995; David Zinman; Z00107 / SD027175.

Web site pricing draft; Nov. 7, 1995; Jason Strober, Z00108 / S0027176.

Heads up . . . (fwd); Nov. 8, 1995; David Zinman; Z00109-Z00110 / SD027177-SD027178.

Proposal to Intel; Nov. 13, 1995; Jason Strober; Z00111-Z00114 / SD027179-SD027182.
FocaLink white paper; Nov. 13, 1995; Jason Strober; Z00115-Z00116 / SD027183-S0027184.
FocaLink Media Services; Nov. 14, 1995; David Zinman; Z00117-Z00119 / SD027185-SD027187.
I/Traffic & Dave Carlick; Nov. 14, 1995; David Zinman; Z00120 / SD027188.
FocaLink white paper; Nov. 15, 1995; David Zinman; Z00121-Z00123 / SD027189-SD027191.
Re: FocaLink Meeting (fwd); Nov. 20, 1995; Karen Johnson; Z00124-Z00125 / SD027192-SD027193.
Microsoft ads through FocaLink; Nov. 21, 1995; Jason Strober; Z00126 / SD027194.
Re: Who's in and who's out (fwd); Nov. 21, 1995; Jason Strober; Z00127-Z00128 / SD027195-SD027196.
Intel update (fwd); Nov. 23, 1995; Jason Strober, Z00129-Z00130 / SD027197-SD027198.
Saturn reports; Dec. 5, 1995; Jennifer Ratner; Z00134-Z00140 / SD027199-SD027205.
November Report; Dec. 5, 1995; Jennifer Ratner; Z00141-Z00146 / SD027206-SD027211.
FocaLink Media Services; Dec. 6, 1995; David Zinman; Z00147 / SD027212.
FocaLink Media Services; Dec. 6, 1995; David Zinman; Z00148 / SD027213.
FocaLink Media Services; Dec. 6, 1995; David Zinman; Z00149 / SD027214.
FocaLink for the Layman; Dec. 6, 1995; David Zinman; Z00150 / SD027215.
Microtargeting; Dec. 7, 1995; David Zinman; Z00151 / SD027216.
Info on FocaLink Media Services; Dec. 11, 1995; David Zinman; Z00152-Z00154 / SD027217-SD027219.
FocaLink Media Services; Dec. 11, 1995; David Zinman; Z00155-Z00156 / SD027220-SD027221.
Catch-up time; Dec. 11, 1995; David Zinman; Z00157 / SD027222.
Info on FocaLink; Dec. 13, 1995; David Zinman; Z00158-Z00160 / SD027223-SD027225.
Intel Ad on Dilbert Site; Dec. 13, 1995; David Zinman; Z00161 / SD027226.
Re: Intel Ad on Dilbert Site; Dec. 13, 1995; David Zinman; Z00162 / SD027227.
FocaLink Beta Test on SmartBanner; Dec. 14, 1995; David Zinman; Z00163 / SD027228.
I/Pro Mtg Today; Dec. 19, 1995; David Zinman; Z00164 / SD027229.
Eric Smith Quote (fwd); Jan. 10, 1996; David Zinman; Z00165 / SD027230.
FocaLink Communications, Inc.; Jan. 10, 1996; David Zinman; Z00166 / SD027231.
Re: Advertisers for wyp.net; Jan. 12, 1996; David Zinman; Z00167 / SD027232.
Quote for Press Release; Jan. 15, 1996; David Zinman; Z00168 / SD027233.
Re: Quote for Press Release; Jan. 16, 1996; "thomas mark"; Z00169 / SD027234.
Re: Quote for Press Release (fwd); Jan. 16, 1996; David Zinman; Z00170-Z00171 / SD027235-SD027236.
RE> **Ad Placement Notific; Jan. 19, 1996; Dan_Stoller@anlsf.com; Z00172-Z00173 / SD027237-SD027238.
Invitation; Jan. 25, 1996; wilkins@eit.com; Z00174 / SD027239.
Focalink; Jan. 25, 1996; David Zinman; Z00175 / SD027240.
SmartBanner Reports; Jan. 25, 1996; David Zinman; Z00176 / SD027241.
RE: Focalink; Jan. 26, 1996; Rick Vorhaus; Z00177 / SD027242.
Comments; Jan. 29, 1996; David Zinman; Z00178-Z00182 / SD027243-SD027247.
Poppe Tyson/Internet Advertising Network Alliance; Feb. 26, 1996; Ron Kovas; Z00183 / SD27248.
Fyi; Feb. 5, 1996; "Roger Follis"; Z00184-Z00185 / SD027249-SD027250.
Focalink Communications; Feb. 5, 1996; David Zinman; Z00186-Z00188 / SD027251-SD027253.
Microsoft Update; Feb. 5, 1996; Margaret Bond; Z00189 / SD027254.
Focalink Communications; Feb. 6, 1996; David Zinman; Z00190-Z00192 / SD027255-SD027257.
Focalink Communications; Feb. 6, 1996; David Zinman; Z00193-Z00195 / SD027258-SD027260.
Focalink Communications; Feb. 6, 1996; David Zinman; Z00196-Z00198 / SD027261-SD027263.
[Fwd: Re: DoubleClick and IAN]; Feb. 6, 1996; Jason Strober; Z00199 / SD027264.
Focalink Communications; Feb. 6, 1996; David Zinman; Z00200-Z00202 / SD027265-SD027267.
Test With Focalink; Feb. 7, 1996; David Zinman; Z00203 / SD027268.
Urgent—Microsoft Ad Placement; Feb. 7, 1996; David Zinman; Z00204 / SD027269.
Test for Microsoft Banner, Feb. 8, 1996; Joel Bassuk; Z00205 / SD027270.
ZDNet Test; Margaret Bond; Feb. 8, 1996; Z00206 / SD027271.
URLs; Feb. 8, 1996; Dan Stoller; Z00207-Z00208 / SD027272-SD027273.
HeadsUp Feb. 9, 1996 (20 stories)<CD58M010>; Feb. 9, 1996; An Information Service of Individual Inc.; Z00209-Z00212 / SD027274-SD027277.
Focalink Communications; Feb. 13, 1996; David Zinman; Z00213 / SD027278.
Targeting; Feb. 13, 1996; Michael Wang; Z00214 / SD027279.
Re: Cookies?; Feb. 15, 1996; David Zinman; Z00215 / SD027280.
Focalink; Feb. 22, 1996; Jason Strober; Z00216 / SD027281.
Focalink/Microsoft I.E.; Feb. 23, 1996; Margee Bond; Z00217-Z00218 / SD027282-SD027283.
Cookies; Mar. 6, 1996; David Zinman; Z00219 / SD027284.
Did I send this 2x; Apr. 3, 1996; Z00220-Z00222 / SD027285-SD027287.
Answer to your request; Apr. 8, 1996; Z00223 / SD027288.
Site Letter; Apr. 10, 1996; Z00224-Z00225 / SD027289-SD027290.
Oracle and Intel; Apr. 12, 1996; Z00226 / SD027291.
Doubleclick; Apr. 16, 1996; Z00227 / SD027292.
Open Market Licenses With NetGravity; May 6, 1996; Z00228 / SD027293.
Fact check; May 12, 1996; Z00229 / SDD27294.
IDG; May 17, 1996; Z00230-Z00231 / SD027295-SD027296.
Daily Spectrum; May 20, 1996; Z00232-Z00242 / SD027297-SD027307.
Fact check; May 20, 1996; Z00243 / SD027308.
Cookie FAQ; May 21, 1996; Z00244 / SD027309.
Focalink Communications; May 21, 1996; Z00245-Z00246 / SD027310-SD027311.
Network World Fusion; May 22, 1996; Z00247 / SD027312.
Looming issue; Jul. 13, 1996; Z00248-Z00249 / SD027313-SD027314.
Cookies & privacy ? / Gernan Press; Jul. 15, 1996; Z00250 / SD027315.
Cookies & privacy ? / German Press; Jul. 16, 1996; Z00251 / SD027316.
DoubleClick; Sep. 5, 1996; Z00252-Z00253 / SD027317-SD027318.
Infoseek Business Terms; Sep. 7, 1996; Z00254-Z00256 / SD027319-SD027321.
SmartBanner ads on HotWired; Sep. 11, 1996; Z00257 / SD027322.
Statement of Work; Sep. 23, 1996; Z00258-Z00259 / SD027323-SD027324.
NetGravity Releases Adserver 2.0; Oct. 21, 1996; Z00260-200263 / SD027325-SD027328.
"Focalink"; DC004278A.
"FocaLink Services"; FocaLink Media Services, Inc.; DC004278B-DC004278C.
"Welcome to Focalink!"; Focalink Communications; DC004278D-DC004278CC.
"Welcome to Focalink!"; Focalink Communications; DC004278DD-DC004278XX.
"*Link Marketing*"; handwritten page; MA0001.
"Link Marketing"; LinkMarket; MA0002-MA0007.

"LinkMarket"; David Zinman et al.; MA0008-MA0027.
"Link Marketing, LLP"; MA0028-MA0029.
"Link Marketing LLP"; MA0030-MA0038.
"Escapes"; Web page; MA0039-MA0040.
"Industry Overview"; FocaLink Media Services, Inc.; MA0041-MA0053.
"Executive Summary"; Focalink Communications Confidential; printed Jul. 30, 1997; MA0054-MA0109.
"Focalink Communications"; Feb. 1996; MA0110-MA0149.
Link Marketing Business Plan, dated May 11, 1995, 2 pages.
E-mail re Web site pricing draft, dated Tuesday, Nov. 7, 1995, 10:55 a.m., 1 page.
E-mail re Microsoft ads through FocaLink, dated Tuesday, Nov. 21, 1995, 14:02 p. m., 1 page.
E-mail re November Report, dated Tuesday, Dec. 5, 1995, 12:55 p. m., 6 pages.
E-mail re Saturn Reports, dated Tuesday, Dec. 5, 1995, 12:40 p. m., 7 pages.
E-mail re Intel Report Nov. 27, 1995—Dec. 3, 1995, mailed Tuesday Dec. 12, 1995, 5:35 p. m., 15 pages.
Brochure: Welcome to Focalink!, dated Mar. 14, 1996, 24 pages.
E-mail re FYI, mailed Feb. 5, 1996, 7:08 a.m., 2 pages.
E-mail re Proposal to Intel, mailed Monday, Nov. 13, 1995, 22:56 p. m., 4 pages.
Declaration of Dwight Allen Merriman, signed Feb. 9, 2001, 10 pages.
Google's Preliminary Invalidity Contentions, dated Jun. 26, 2009, 12 pages.
Exhibits A and B, 60 pages, dated Jun. 26, 2009.
Link Marketing Business Plan, dated May 28, 1995, 6 pages.
Link Marketing Business Plan, dated Jun. 6, 1995, 24 pages.

* cited by examiner

FIG. 3A

| USER ID | IP ADDRESS | DOMAIN TYPE | TIME ZONE | LOCATION | SIC | ADS SEEN | ADS CLICKED ON | PAGES ADS SEEN ON |
|---|---|---|---|---|---|---|---|---|

FIG. 3B

| AD ID | START DATE | END DATE | TOTAL VIEWED | SIC's | TARGET NO. | PRIOR CLICKED ON's | PAGES ADS SEEN ON |
|---|---|---|---|---|---|---|---|

FIG. 3C

| DOMAIN NAME | NETWORK ADDRESS | SIC | GEOGRAPHIC LOCATION | TIME ZONE | NO. OF EMPLOYEES |
|---|---|---|---|---|---|

METHOD OF DELIVERY, TARGETING, AND MEASURING ADVERTISING OVER NETWORKS

CROSS-REFERENCE TO RELATED APPLICATIONS

This is a divisional of U.S. patent application Ser. No. 10/254,923, filed on Sep. 26, 2002, pending, which is a continuation of U.S. patent application Ser. No. 09/293,463, filed on Apr. 15, 1999, abandoned, which is a continuation of U.S. patent application Ser. No. 08/738,634, filed on Oct. 29, 1996, issued as U.S. Pat. No. 5,948,061, currently in reissue under Reissue application Ser. No. 09/577,798, filed May 24, 2000.

BACKGROUND OF THE INVENTION

1. Area of the Art

This invention relates to methods of delivery of advertisements and measuring responses to those delivered advertisements and in particular relates to the targeting of advertisements delivered over networks such as the Internet.

2. Description of the Prior Art

In advertising, it is considered highly desirable to target advertisements to the appropriate potential customer base, rather than to broadcast advertisements in general. It has long been known that, for example, advertisements for computers should generally not appear in magazines on gardening and, conversely, advertisements for gardening tools should not appear in magazines on computers. Similarly, advertisers have generally targeted their advertisements on television to programs appropriate for the desired customer base.

It has also long been known that an advertisement that is repeated too often will eventually become ignored by consumers. Therefore, an advertiser typically wishes to eliminate duplication and reach as many individuals in the advertiser's target group as possible.

The recent development of on-line networks, such as America On-Line, Compuserve, and the Internet, has led to "on-line" advertising. For example, on the Internet, often such on-line advertisements will appear on a web page, such as a banner on the top or the bottom of the page. When the user views a web page using a browser such as Internet Explorer 3 or Netscape 3, the banner appears at the appropriate location and the user may then try to find out more information regarding the advertisement by selecting the advertisement (clicking through on that banner) through the use of the mouse or other pointing device. This will cause a HTTP message to be generated by the browser using the information encapsulated in association with the banner to send a request for an object with a given URL address to a different appropriate web site to access, for example, the advertiser's home page.

Nonetheless, such advertising has had, so far, a poor rate of response because it is untargeted advertising. Thus, someone who is totally uninterested in computers other than they happen to be on the Internet, may continually see advertisements for computers. On the other hand, someone who is interested in computers may continually see advertisements for gardening tools when browsing through a particular web site. Thus it would be highly desirable to have a method of targeting the advertising to the appropriate user.

In addition, if a user of such computer networks is continuously exposed to the same advertisement, the response rate to the advertisement will generally decline. Therefore, it is highly desirable to have a system that controls the frequency of exposure of advertisements to particular users. In addition, it is also important for the advertisers to track response to the advertisements and to acquire as much information about those people responding to the advertisements for targeting those same people at later dates.

Therefore, it is a first object of this invention to provide targeting of advertising over networks such as the Internet. It is a second object of this invention to provide control over frequency of exposure to users for advertisements appearing on web pages over time. It is a third object of the invention to provide the capability to gather information about recipients of the advertisement.

SUMMARY OF THE INVENTION

These and other objects of the invention are achieved by the disclosed system and methods. Information about networks and subnetworks is routinely collected. In addition, information about individual users is also gathered when users select (click on) different advertisements. Also, data is tracked on how often a given advertisement has been displayed, how often a given user has seen a given advertisement, and other information regarding the user and the frequency of the display of the advertisement.

To effect such a capability, an advertising server process is provided as a node on the network. The various advertisements are stored on the network of the server and preferably on the server. When, for example, a user using a web browser accesses a web page that is affiliated with the advertising server process, the affiliated page's encoding includes an embedded reference to an object provided by the advertising server process. That causes the user's browser to contact the advertising server process to provide the advertising image or information that will appear on the accessed web page as displayed by the user's browser. Using the address information and/or other information passed by the browser for the user, including the page being accessed by the user, the advertising server process determines an appropriate advertisement to select for the particular user. In addition, the advertising server process will use information such as the number of times the user has seen various advertisements, how often the advertisement has been seen by any user and the start and stop date for the various advertisements to select which advertisement to transmit to the user's web page for display.

If the user decides to respond to the advertisement selected by the web server by clicking on the advertisement, the advertising server process logs that fact and to have more information about the given user. A derive profile process is used for compiling information on TCP/IP networks for use by the advertising server process. By compiling the information on networks and user selections, the advertising server process is able to compile information that can be used for targeting advertising.

DESCRIPTION OF THE FIGURES

FIGS. 3A, 3B and 3C are diagrams showing the basic structure of some of the databases kept by the advertising server.

DETAILED DESCRIPTION OF THE INVENTION

Figure 1:
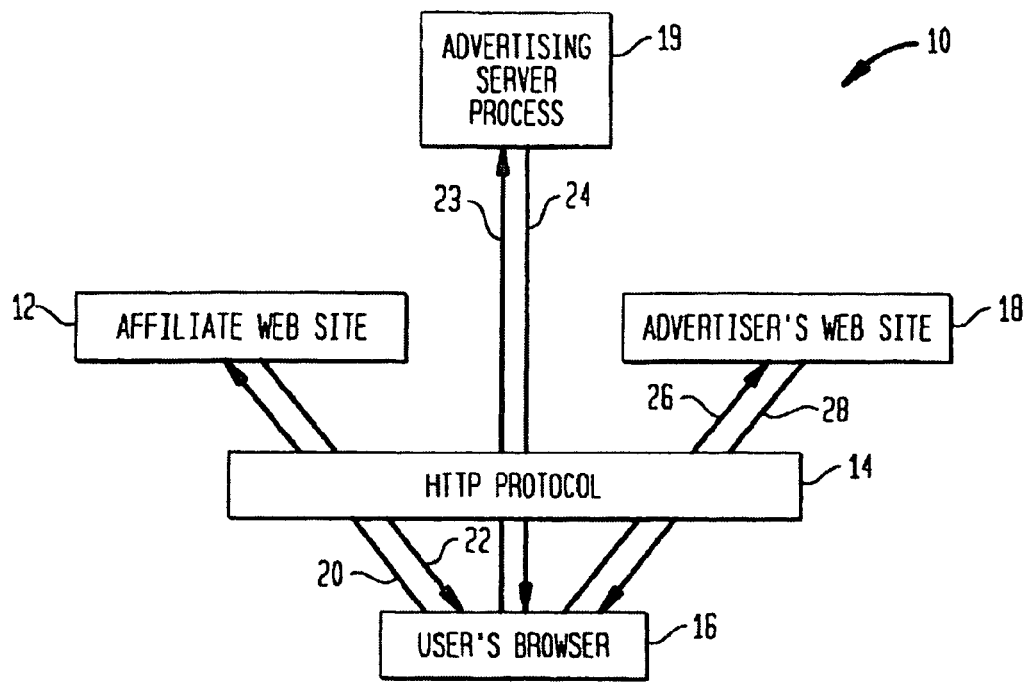
FIG. 1 is diagram for explaining a first embodiment of the invention.

The basic architecture of the network 10 comprises at least one affiliate web site 12, an advertisement (ad) server web site 19 and one or more individual advertiser's web sites 18.

Affiliates are one or more entities that generally for a fee contract with the entity providing the advertisement server permit third party advertisements to be displayed on their web sites. When a user using a browser accesses or "visits" a web site of an affiliate, an advertisement provided by the advertisement server 19 will be superimposed on the display of the affiliate's web page displayed by the user's browser. Examples of appropriate affiliates include locator services, service providers, and entities that have popular web sites such as museums, movie studios, etc.

The basic operation of the system is as follows in the preferred embodiment. When a user browsing on the Internet accesses an affiliate's web site 12, the user's browser generates an HTTP message 20 to get the information for the desired web page. The affiliate's web site in response to the message 20 transmits one or more messages back 22 containing the information to be displayed by the user's browser. In addition, an advertising server process 19 will provide additional information comprising one or more objects such as banner advertisements to be displayed with the information provided from the affiliate web site. Normally, the computers supporting the browser, the affiliate web site and the advertising server process will be at entirely different nodes on the Internet. Upon clicking through or otherwise selecting the advertisement object, which may be an image such as an advertisement banner, an icon, or a video or an audio clip, the browser ends up being connected to the advertiser's server or web site 18 for that advertisement object.

In FIG. 1, a user operates a web browser, such as Netscape or Microsoft Internet Explorer, on a computer or PDA or other Internet capable device 16 to generate through the hypertext transfer protocol (HTTP) 14 a request 20 to any one of preferably a plurality of affiliate web sites 12. The affiliate web site sends one or more messages back 22 using the same protocol. Those messages 22 preferably contain all of the information available at the particular web site 12 for the requested page to be displayed by the user's browser 16 except for one or more advertising objects such as banner advertisements. These objects preferably do not reside on the affiliate's web server. Instead, the affiliate's web server sends back a link including an IP address for a node running an advertiser server process 19 as well as information about the page on which the advertisement will be displayed. The link by way of example may be a hypertext markup language (HTML)<img> tag, referring to, for example, an inline image such as a banner. The user's browser 16 then transmits a message 23 using the received IP address to access such an object indicated by the HTML tag from the advertisement server 19. Included in each message 23 typically to the advertising server 19 are: (i) the user's IP address, (ii) a cookie if the browser 16 is cookie enabled and stores cookie information, (iii) a substring key indicating the page in which the advertisement to be provided from the server is to be embedded, and (iv) MIME header information indicating the browser type and version, the operating system of the computer on which the browser is operating and the proxy server type. Upon receiving the request in the message 23, the advertising server process 19 determines which advertisement or other object to provide to user's browser and transmits the messages 24 containing the object such as a banner advertisement to the user's browser 16 using the HTTP protocol. Preferably contained within the HTTP message is a unique identifier for the advertiser's web page appropriate for the advertisement. That advertisement object is then displayed on the image created by the web user's browser as a composite of the received affiliate's web page plus the object transmitted back by the advertising web server.

As part of the "click through" process, when the user clicks on the banner or other advertising object displayed by the user's browser 16, the user's browser again transmits a message to the ad server. The ad server notes the address of the computer of the browser (or any other identifier such as a cookie or a digital signature) that generated the message 23 and transmits back the URL of the advertiser's web page so that the user's web browser 16 generates a message 26 to contact the advertiser's web site. 18. The ad server process 19 also notes that a "click through" for an advertisement has occurred and updates the various databases in the manner described below. In the above scenario for the click through process, the ad server process must remember which advertisement was sent to the user's browser in order to know where to redirect the user's browser.

While in the above embodiments, the user is a computer on an IP network using a browser, the affiliate web sites are web pages of affiliates located somewhere on the Internet and the ad server is a particular node on the Internet, other setups are also possible. The affiliates may be ISP's or may be actual dedicated web servers and the users may be an entire network instead of an individual browsing on a single computer with a browser.

Figure 2:
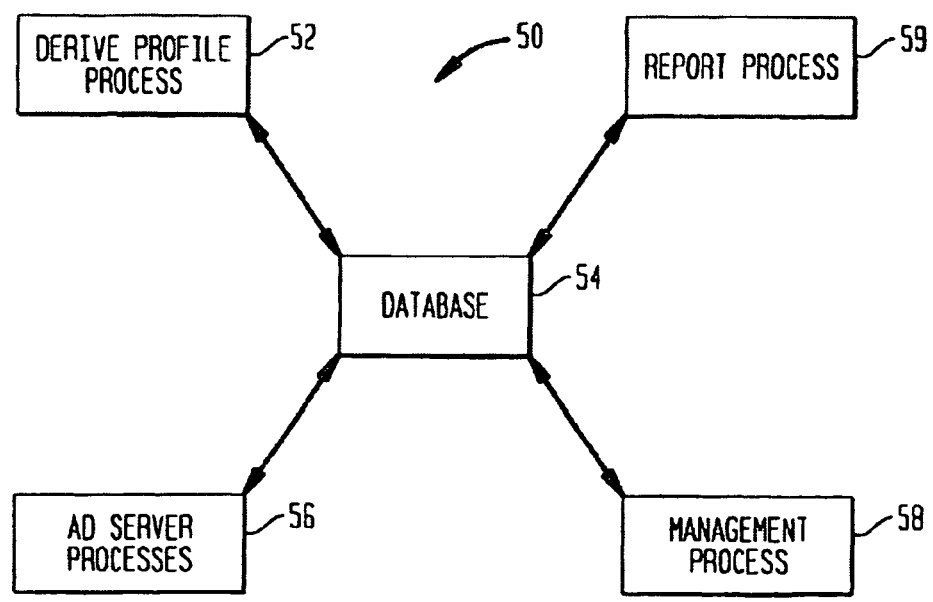
FIG. 2 is a diagram explaining the processes performed in the preferred embodiments.

FIG. 2 shows the ad server architecture. The ad server, which may comprise one or more servers uses a database 54 that will be described below and performs reporting processes 59, management processes 58, derivation of profile processes 52 and advertisement processes 19. The derive profile process 52 is how the advertisement server gathers information about individual users or TCP/IP networks for individual users. Advertisements, which may be advertisement banners are stored within the ad server process 19 as part of the advertising server process 19 and are periodically updated and refreshed. The advertisement server process 19 is used for responding to requests from advertisements provided by the user's as described above. The management process 58 is used for updating the various advertisements and overall control of the advertising server process 19 and also permits the advertisers to interface with the database to obtain up to the date reports on the placement of the advertisements. The report process 59 is used for generating online reports about the success rate of the advertisement and statistics on the users that are viewing and clicking through on various advertisements and also updating the counters in the database that store how often an advertisement has been displayed.

The basic database structure is shown in FIG. 3. For each user identified by the system as shown in FIG. 3A, a user identification, IP address, domain type, time zone, location of the user, standard industrial code for the user's network, the particular advertisements seen and the number of times each such advertisement is seen, the advertisements that were selected or "clicked on" and the pages on which the various users' advertisements were seen is collected. By using the information such as which advertisements a user has expressed interest in and which pages the user was viewing when the user clicked through along with other information, targeted Internet advertising is possible.

FIG. 3B shows a database structure for the advertisements. Included in the information for an advertisement are an identifier for the advertisement, the start date for the advertisement being carried, the last date the advertisement is to be carried, the total number of people who have viewed the advertisements, the target or the minimum number of times the advertisement is to be viewed, acceptable viewers by their web site's SICS (Standard Industry Codes), clicked through and pages that the advertisements are seen on.

Also, as noted above, to enhance the process of identifying information about various users, information on domains or networks is also tracked. This information includes the domain name and type (e.g., military, government, commerce, foreign countries), the IP address, the standard industrial code, the time zone and the address as shown in FIG. 3C. This information can be used in developing information about users. Through the use of these three databases and other appropriate databases that may be kept, the various processes of the advertising server process 19 are performed.

Advertising Server Processes 19

In response to an incoming message to the advertising server process 19, the advertising server processes 19 first attempts to identify the user in FIG. 2. This can be accomplished by at least one of two means. First, any incoming request for an image or a multimedia object is examined to determined the IP address of the requesting browser. The advertising server then notes whether a cookie was received in the MIME heading of the request. From these two pieces of information, a user identification is determined. If a cookie was detected, then the cookie contains the user's identification number that can be accessed in the database. If the user's browser is cookie enabled but no cookie is detected, then the request is from a new user so a user identification must be assigned to the user and that user's new identification number will be transmitted back to the users browser along with a write cookie instruction that causes the browser to write a cookie containing that unique identification number on the user's local drive for future accesses to affiliate sites. The cookie instruction is transmitted back with the advertisement messages 24. Alternatively, instead of using cookies, digital signatures or certificates or log ins uniquely identifying the user accessing the affiliate page may be used.

If the user's browser does not support cookies, the advertising server process looks up the user's IP address in a table that stores identification numbers that correspond to IP addresses for the users who have previously contacted the advertising server process. If the IP address is not found in the table, then the user is a new user and is assigned an unused identification number. Also, for each new user, that user's identification number will be marked for further processing under the derive profile process 52 described below. Also, if the domain for the new user has not previously been processed in the domain profile process, it may not be possible to target the advertisement for the new user and rather the new user should be shown a generic advertisement. Also, for new users, a promotional advertisement may be shown to get the new user to provide information about him or herself and his or her employer.

If the user is an existing user, the ad server 19 obtains from a database all of the information known about the user including the user's geographic location, the domain type (commercial educational, governmental, the Internet service provided), the organization type where the user works (for example a SIC code), the company size, the number of employees in that company, the particular types of advertisements that the user has clicked on by SIC or other appropriate coding and the number of times that the user has been exposed to each advertisement currently in the system as described in FIG. 3A. Also, the relative time of day for the user is calculated based upon either the user's country code or the user's IP access provider or the location of their domain.

Each advertisement along with a table of the targeting profile criteria for the advertisement and other data regarding the advertisement currently available is stored in a database such as shown in FIG. 3B. The actual advertising object, which may be a banner image in a GIF or JPEG file format, an icon for an audio or video clip or some other object is kept as part of the advertising server process. This information may include targeted consumers by SIC, country, organization type and type of advertisements previously selected by the user. For any of the advertisements currently provided for user, for which there is a match (for example there may be several advertisements targeted at people interested in computers), the next step is to determine which of the advertisements for which there is a match should be selected.

The preferred embodiment also includes determining which advertising object should be selected if two or more advertising object have criteria matching the user. selecting from the matched advertisements by determining how often the particular user has been exposed to the given advertisement. For each user, data is kept about the number of times that a user has seen a given advertisement based upon the user ID. For each advertisement where the user matches the criteria, if the number of times that the user has seen the advertisement is less than a predetermined threshold, the advertisement is retained as one of the possible matches. If the number of times that the user has seen a given advertisement exceeds the threshold, the advertisement is discarded as a possible candidate for transmitting back to the user.

From the advertisements for which the user matches the criteria and for which the user has seen the advertisement less than the threshold, any of number of algorithms may be used to select the particular advertisement to transmit back to the user. In an embodiment, the formula used is based upon a satisfaction index (SI) according to the following formula:

$$SI = \frac{n}{N} * \frac{end\text{-}start}{now\text{-}start}$$

Where:
n: the number of times the particular advertisement has been viewed by anyone
N: the number of times the advertisement is to be see by anyone
end-start: the total number of days that the advertisement is scheduled to run
now-start: the number of days that the advertisement has run to date The satisfaction index (SI) is 1.0 when the advertisement is on schedule. If the advertisement is running behind schedule (i.e., the current rate of display means that the advertisement will not be viewed the targeted number of times by the end date so that the SI is less than 1.0) while if the SI is greater than 1.0, the advertisement is running ahead of schedule. Therefore, the advertisement that is to be selected for viewing is the one that has a matched profile and has the smallest SI. Upon selecting the advertisement, the selected advertisement object is then transmitted to the user's browser over the Internet by transmitting the GIF stored in RAM in one or more messages.

After delivery of the advertisement to the user, additional processing needs to be done both for tracking the exposure of the advertisement and for having more information about the user. First, the system stores the fact that the advertisement was sent to the user by storing that information in the database based upon the user ID. This information is used for processing the user's response to the advertisement when the user "clicks" on the advertisement. Also, the advertising processor updates the advertisements satisfaction index and logs the advertisement delivery for providing reports. Also, if the advertisement that has been sent has a limit on the number of times that the advertisement can be sent, the count of the number of times that the advertisement has been transmitted is incremented. This limit can be the overall limit for the number of times that the advertisement is viewed and/or the limit that any specific user can view the advertisement. If the limit on the number of times the advertisement can be sent is reached, then the particular advertisement is removed from the list of those that can be transmitted. In addition, even if an advertisement has not been transmitted recently, the SI is updated to reflect the passage of time.

If the user then decides that he wants to respond to the advertisement and then clicks on the advertisement, the advertisement server 19 receives an HTTP request 23 for a click through which it will recognize by receiving the same IP address (and optionally, the user ID specified by the cookie, digital signature or certificate or log in identification) in the request from the same affiliate's web page within a predetermined period. Since the advertisement server previously recorded which advertisement was sent to that IP address, it sends the redirect message causing the user's browser to receive the URL for the advertiser's web site based upon data stored in the server. In addition, the server logs that the advertisement was clicked through, which user selected the advertisement based upon the IP address, and the page on which the advertisement was seen based upon the click through. This information can then be logged in later reporting processes 59.

As an alternative to using a satisfaction index, the selection of the particular advertisement object to be sent back to the viewer's browser by the advertising server process 19 can be made by different criteria. For example, models can be created to maximize the likelihood of a click through. Such models for maximizing the likelihood of a click through may be based upon empirically gathered information about either types of advertisements or individual advertisements actually on the system correlated to the compiled information on a user or the user's network and the specific page through which the user is accessing the advertising server process 19.

Derivative Profile Process 52

In addition, as part of the profiling process for gathering information about users and IP addresses needs to be done. First, appropriate "networks" need to be identified based upon the TCP/IP network address of the user. Periodically, the derive profiles process searches the user database for the address of additional users that have addresses for unknown networks, indicating that they are new users. Then the server does a reverse domain name search to locate the domain name of the user. The server also queries Internet Whols databases to find information about the network, which will often include the domain name.

Alternatively, a reverse form of look up can be used independent of people accessing the network. When a domain is discovered, the server will check common DNS names for the name, such as those starting with "www" and "ftp". These resolve to IP addresses in most cases. From the IP addresses, the network number can be extracted and if the network does not yet have a domain name associated with the network number or address, the new domain associated with the network. A reverse domain name look up (A Whois lookup) will then usually provide the name, address and phone number of the organization, thereby providing the geographic location and the time zone of the network. Once the domain name is acquired, the server will determine whether the domain is an educational, military, governmental network and for non-U.S. based networks what country the network is located in through the extension.

However, it should be noted that some networks cover broad geographic areas and that further checking needs to be done to ensure that the data may be inaccurate. This can be done by performing a trace route operation to trace the network topology back to the network being examined. If the last two or three nodes on the trace show as being from a given region, the chances are high that the specific user on a network is located in that geographic area. Thus, reverse traces can be used to confirm location with a database for geographic locations. By checking telephone directories and other sources, the specific location for such users may be found by looking up the locations where the owner of the domain name has facilities and using the one closest to the outcome of the trace back step If the information for a given user is different than the location of the domain based upon the trace back, it is this address and location information that is then used.

Further for each domain that is found, a determination must be made as to whether the domain is an Internet Service Provider (ISP). A list of domains that are ISP's is compiled manually. For any user having a domain name of an ISP, the user is presumed to be an individual and so only information relating to that individual are used for the profiling process.

Reporting Process

The reporting process uses standard database techniques for generating any desired reports. For example, reports showing the number of viewings and click throughs of various advertisements may be generated along with reports showing the click through rates relative to the matching criteria. Also, reports on the SI can be readily generated.

In addition to using the domain profiling process and logging advertisement clicked on by individual users and the pages being accessed by users of affiliate web sites, in addition surveying may be used. Further, for those survey respondents who are responding for non-ISP users discussed above, the results of the survey can be attributed to others on the same network. This provides further information for targeting the display of the advertisements.

Of course, those of skill in the field will understand that the disclosed techniques need not just be confined to Internet advertising but will work on other communication networks and private on line services such as CompuServe and America On Line. In addition, while specific user and domain profile information and matching criteria are discussed, it will be obvious to those of ordinary skill in the field that the specific type of user and domain name information profiled and used as matching criteria may include other or different criteria. In addition, while the specific examples are for IP networks, the same concepts can be applied to virtual LAN's such that a VLAN is the equivalent of a domain or on IPX based protocols or other network protocols.

Still further, rather than using cookies or IP addresses or other network addresses to identify the users, digital signatures or certificates may be used. In addition, a log in technique may be used whereby when users first access an affiliated web site, the user is assigned through a log in procedure a unique identifier and a log in name. When the user subsequently accesses either the same or a different affiliated web site, the user logs in using the unique identifier, thereby ensuring that users can be identified notwithstanding proxy servers or different users using the same computer.

Still further, those of ordinary skill in the field will also understand that while the advertising server, the affiliate web site and the advertiser's web site are described as being in different geographic locations, that is not required. Still further, while the advertising server process, reporting process, derive profile process and management process are described as being implemented on one computer platform performing all of the above described functions, it is readily understood by those of skill that any or all of these functions may be implemented on one or more different computers and further that these processes may be performed at different nodes on the network.

We claim:

1. An apparatus for advertising, comprising:
a processor;
a memory storing instructions for a derive profile process adapted to be executed by said processor to collect information based upon a plurality of advertisement requests received from a user node;
a database that stores said information;
a memory storing instructions for an advertisement server process adapted to be executed by said processor to select, in response to an advertisement request, an advertisement based upon said information collected by said derive profile process stored in said database, wherein said advertisement request is generated by the user node in response to processing a link received from a first affiliate node in response to a prior content request sent from said user node to said first affiliate node, and wherein said advertisement is associated with a second affiliate node;
a memory storing instructions for a management process adapted to be executed by said processor to update advertisements available to be selected by said advertisement server process; and
a memory storing instructions for a report process adapted to be executed by said processor to generate a report about the placement of advertisements.

2. The apparatus of claim 1, wherein said instructions for said advertisement server process are further adapted to be executed to send said selected advertisement to said user node for display.

3. The apparatus of claim 2, wherein said instructions for said advertisement server process are further adapted to be executed to receive from said user node a click through request for information about the second affiliate node associated with said selected advertisement.

4. The apparatus of claim 3, wherein said instructions for said advertisement server process are further adapted to be executed to send a network address for said second affiliate node to said user node in response to said click-though request.

5. The apparatus of claim 3, wherein said stored information includes information about a prior click-through request received from said user node.

6. The apparatus of claim 1, wherein said instructions for said derive profile process are adapted to be executed to perform a reverse domain name lookup based upon an Internet Protocol address associated with one of said plurality of advertisement requests.

7. A computer-implemented method comprising:
receiving, at an ad server computer, a plurality of advertisement requests from a user node, each advertisement request being generated by the user node in response to processing a link received from a first affiliate node in response to a prior content request sent from the user node to the first affiliate node;
collecting information based on the advertisement requests;
selecting, by the ad server computer in response to an advertisement request, an advertisement based upon the collected information, the advertisement being associated with a second affiliate node; and
sending, by the ad server computer, the selected advertisement to the user node for display.

8. The computer-implemented method of claim 7, further comprising updating advertisements available to be selected.

9. The computer-implemented method of claim 7, further comprising generating a report about a placement of advertisements.

10. The computer-implemented method of claim 7, wherein the information includes a domain type.

11. The computer-implemented method of claim 7, further comprising receiving from the user node a click through request for information about the second affiliate node associated with a selected advertisement.

12. The computer-implemented method of claim 11, further comprising sending a network address for the second affiliate node to the user node in response to the click-though request.

13. The computer-implemented method of claim 7, wherein the information includes information about a prior click-through request received from the user node.

14. The computer-implemented method of claim 7, further comprising performing a reverse domain name lookup based upon an Internet Protocol address associated with one of the plurality of advertisement requests.

15. The computer-implemented method of claim 7, wherein selecting an advertisement based upon the collected information comprises selecting an advertisement from among advertisements associated with the affiliate node.

16. The computer-implemented method of claim 7, wherein sending the selected advertisement to the user node for display comprises sending the selected advertisement to the user node for composite display with content requested from the first affiliate node.

17. The computer-implemented method of claim 9, wherein generating a report about a placement of advertisements comprises associating an indication of the content of the first affiliate node for which the advertisement was selected for composite display with information regarding user interaction with the selected advertisement.

18. The computer-implemented method of claim 17, wherein the indication indicates a web page of the first affiliate node in which content requested by the user node is included.

19. The computer-implemented method of claim 8, wherein updating advertisements available to be selected comprises updating, based on the selection of the advertisement, a number of times that the advertisement has been viewed by all users.

20. The apparatus of claim 1, wherein the advertisement server process is adapted to select an advertisement from among advertisements associated with the affiliate node.

21. The apparatus of claim 2, wherein the advertisement server process is adapted to send the selected advertisement to the user node for composite display with content requested from the first affiliate node.

22. The apparatus of claim 1, wherein the report process is adapted to associate an indication of the content of the first affiliate node for which the advertisement was selected for composite display with information regarding user interaction with the selected advertisement.

23. The apparatus of claim 1, wherein the management process is adapted to update, based on the selection of the advertisement, a number of times that the advertisement has been viewed by all users.

* * * * *